S. DOD.
Vacuum-Pans for the Manufacture of Sugar.
No. 134,365. Patented Dec. 31, 1872.
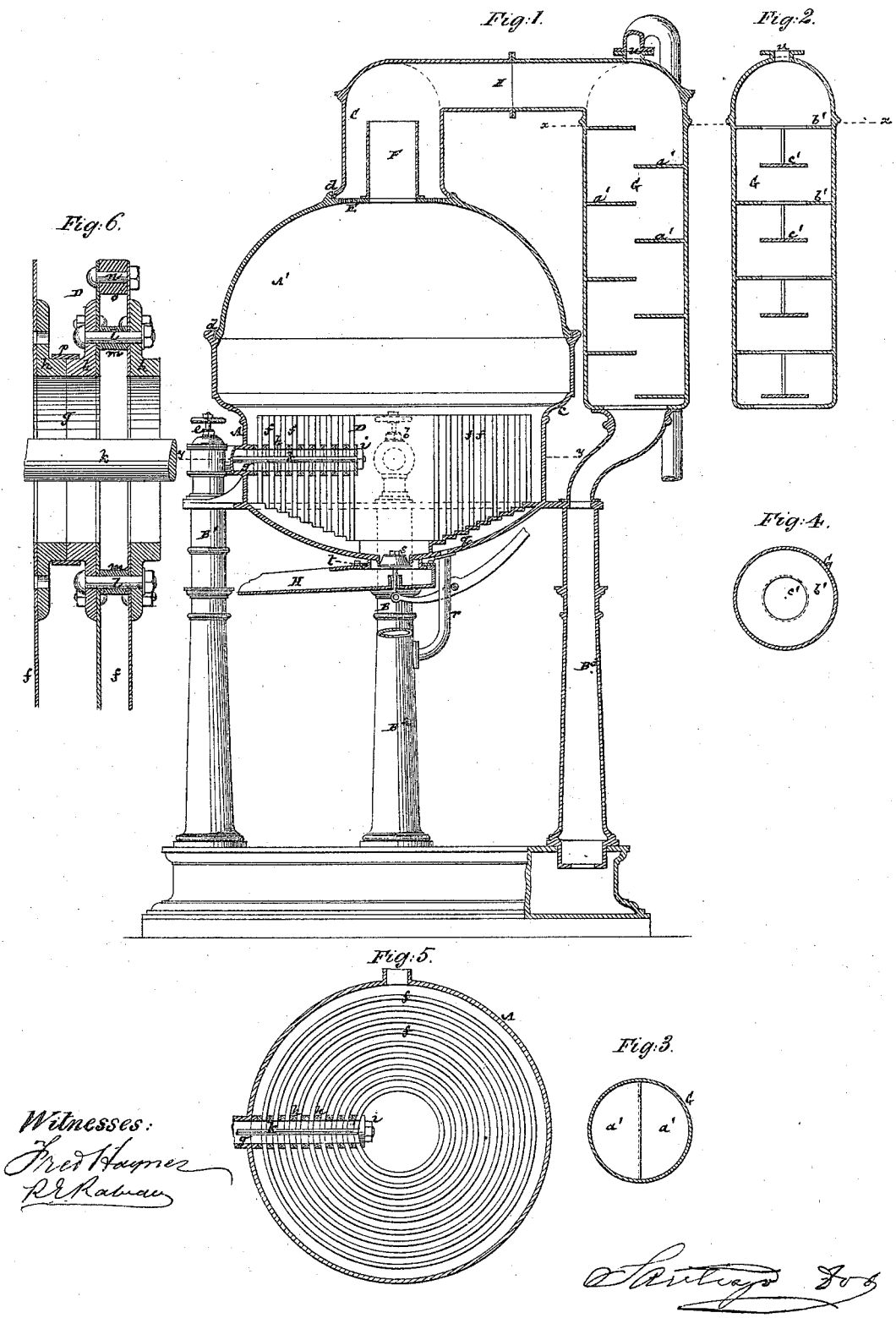

UNITED STATES PATENT OFFICE.

SANTIAGO DOD, OF HAVANA, CUBA.

IMPROVEMENT IN VACUUM-PANS FOR THE MANUFACTURE OF SUGAR.

Specification forming part of Letters Patent No. 134,365, dated December 31, 1872; antedated December 26, 1872.

*To all whom it may concern:*

Be it known that I, SANTIAGO DOD, a citizen of the United States, residing at Havana, in the Island of Cuba, have invented certain Improvements in Vacuum-Pans and Condensers Combined, of which the following is a specification:

This invention is more particularly designed to be applied to the combination of devices for the manufacture of sugar known as constituting the dry-air process, and will here be described in such relation. The invention consists in a vacuum-pan provided with a number of separate hollow heating-sections immersed in the sugar liquid and heated internally by steam, substantially as hereinafter described, whereby a most effective evaporating-surface is obtained and great facility afforded for putting together or taking apart the heater. The invention also consists in a novel construction of the body or shell of the pan, whereby a lower temperature suffices to effect the necessary evaporation. The invention furthermore comprises a swinging or swiveling attachment of the trough to the bottom of the pan for running off the concentrated liquid or sirup, and whereby increased facility is afforded for discharging it at different points or in varied directions, as circumstances or convenience may suggest. Among other features of the invention are also the following: The water of condensation is drawn off from the condenser connected with the vacuum-pan from below, by means of a pump, and said condenser arranged in close relation with the vacuum-pan and at such an altitude relatively to the pan that the water used to effect condensation will be raised to the condenser by the pressure of the atmosphere without the aid of a pump. Furthermore, the columns which support the vacuum-pan and condenser are made hollow, and all utilized as pipes to and from said structures for the manufacture of the sugar.

In the accompanying drawing which forms part of this specification, Figure 1 represents a vertical section of a vacuum-pan with condenser attached; Fig. 2, a vertical section of the condenser under a modified construction of its details; Figs. 3 and 4, horizontal sections at the line $x\,x$ of the two forms of condensers shown in Figs. 1 and 2; Fig. 5 is a horizontal section through the vacuum-pan at the line $y\,y$, in illustration of the heater used therein; and Fig. 6, an enlarged sectional view of the heater in part, in explanation of its construction.

A A′ indicate the vacuum-pan, to which the juice is conveyed by pipe and up one, B, of the columns by which said pan is supported, the introduction being regulated by a valve, $b$. The lower portion A of the pan in which the heater is arranged is of a uniformly-reduced diameter or area throughout that part of it which contains the heater and is abruptly increased by a jog or swell, $c$, above such part. This rapid increase in area from the top of the heater gives a quick and large increase to the volume of liquid or juice above the heater and to the evaporating surface thereof without objectionably increasing the depth of the whole volume of liquid in the pan, so that the concentration in the pan may be effected at a lower temperature than is practicable with the ordinary construction of pan. The upper portion A′, as also a dome or chamber, C, on top of the pan, are united with each other and with the lower portion A by constructing said parts where they form joints with one another, respectively, with beveled edges and beveling recesses or seats $d$, and securing the same by cement introduced within the beveling seats or recesses.

This mode of forming the joints is cheap, collection of dirt within the joints is avoided, bolts are dispensed with; consequently the joints may be kept tighter, which is important as affecting the maintenance of the vacuum in the pan, and in case of leakage the same may be stopped by the simple application of paint to the flush joint; also, the several parts be more readily taken apart when required.

The heater D within the pan, which is supplied with exhaust steam subject to the control of a valve, $e$, by a pipe from the engine used in the works and up one, B¹, of the columns by which the pan is supported, consists of a number of independent hollow sections, $f$, which may either be set vertical or inclined, and may be flat, oval, square or corrugated, but which are here shown as composed of a number of concentrically-arranged hollow rings. These receive the steam on one side of the pan by a tubular passage, $g$, composed in part of washers or clamps $h$ introduced between the rings, and closed at its inner end, where a nut, $i$, fitting a tie-bolt, $k$, serves to bind the several sections and their intervening washers together.

The hollow rings are composed of plates united by bolts $l$ passing through them and the washers or clamps $h$, also through packing-blocks in between the plates, said washers or clamps being separately attached to their respective plates. Bolts $n$ also pass through outer packing-blocks $o$ between the plates, and bands $p$ surround the joints formed at the junction of the washers, all as shown in Fig. 6. The spent steam or water of condensation from these hollow rings passes out through holes in the bottom of the rings on the opposite side of the pan to that at which steam was received, and escapes into a false bottom or space, $q$, from whence it passes off by a branch, $r$, down another, $B^2$, of the supporting-columns. This construction of the heater, which latter is wholly immersed in the liquid and heated from the interior by the steam, insures a large heating-surface under exposure to the liquid, and admits of the heater being readily put together and taken apart. Arranged in the top of the vacuum-pan, so as to form a seat or bottom to the dome or chamber C, is a perforated plate or surface, E, with an enlarged central opening through it, on or around which is mounted a short pipe, F, open top and bottom. This perforated plate and pipe, which latter operates as a safety-column, serve to prevent the juice or liquid passing from the pan to the condenser G and being lost. Thus the foam from the liquid, in rising, will be broken by the perforated plate E, and that which escapes up the pipe F will break into solid liquid at the top edge of the pipe, and, falling back upon the plate, will be returned to the pan through the perforations in the plate. The trough or spout H, by which the concentrated juice is run from the vacuum-pan into any suitable kettle or receiver, on opening a valve, $s$, is carried by a ring, $t$, arranged to rest upon, and so as to be capable of turning around, a flanged discharge-neck projecting from the bottom of the pan, whereby said delivery trough or spout may be swung or swiveled to point in different directions to adapt it to different receivers or positions of discharge. The condenser G is arranged in close relation with the vacuum-pan, and connects near its top with the latter, through the dome C, by a short pipe or duct, I, which conveys the vapor rising from the pan to the condenser. The water to effect condensation is received by a pipe or opening, $u$, through the top of the condenser, and is drawn or pumped off from below through one, $B^3$, of the columns which carry the vacuum-pan. Said condenser stands on the same level as the vacuum-pan; or, rather, its upper portion occupies such an altitude in relation with the pan that the water, to effect condensation, will be forced by atmospheric pressure, as against the vacuum in the pan, up to and down through the receiving-inlet $u$ without the aid of a pump.

The interior construction of the condenser is made up of a number of dividing-plates, arranged one below the other, and extending horizontally, or thereabout, more or less, across it, so as to form a succession of reverse steps for the purpose of promoting or improving the action of the condenser, such steps or divisions either being formed of reversely-arranged side plates $a'$ $a'$, Figs. 1 and 3, or of side rings $b'$ $b'$ and insulated intermediate plates $c'$ $c'$, Figs. 2 and 4.

The water is drawn down through the condenser and out of the column $B^3$ by a pump, which may operate conjointly with the air-pump for exhausting the vacuum-pan.

What is here claimed, and desired to be secured by Letters Patent, is—

1. The combination, with the vacuum-pan A A', of the heater D, composed of independent hollow sections or rings $f$ and washers or clamps $h$, arranged to form a tubular passage, $g$, for the supply of steam to the rings, substantially as specified.

2. The lower section A of the vacuum-pan, formed with a swell or jog, $c$, above the level of the heater, in combination with the upper enlarged section A' and dome or chamber C, united with each other by bevel-seated joints $d$, essentially as described.

3. The swinging or swiveling discharge-trough H, constructed and arranged in relation with the outlet for the sugar liquid from the vacuum-pan, and for adjustment around said outlet, substantially as described.

4. The combination, with the vacuum-pan A A' and condenser G, of the hollow columns B B¹ B² B³, arranged to form ducts, essentially as and for the purposes specified.

5. The combination, with the vacuum-pan, of the condenser G, when arranged in relation with each other, as described, whereby the water to effect condensation is supplied to the upper portion of the condenser by atmospheric pressure as against the vacuum in the pan, and without the aid of a pump, substantially as specified.

SANTIAGO DOD.

Witnesses:
FRED. HAYNES,
R. E. RABEAU.